United States Patent
Kim et al.

(10) Patent No.: US 8,535,833 B2
(45) Date of Patent: Sep. 17, 2013

(54) NON-AQUEOUS ELECTROLYTE SOLUTION FOR LITHIUM SECONDARY BATTERY AND LITHIUM SECONDARY BATTERY COMPRISING THE SAME

(75) Inventors: Soo-Jin Kim, Daejeon (KR); Jeong-Ju Cho, Daejeon (KR); Su-Jin Yoon, Gyeonggi-do (KR); Yong-Joon Ha, Daejeon (KR); Chul-Haeng Lee, Daejeon (KR); Jeong-Hwan Koh, Daejeon (KR)

(73) Assignee: LG Chem, Ltd. (KR)

( * ) Notice: Subject to any disclaimer, the term of this patent is extended or adjusted under 35 U.S.C. 154(b) by 327 days.

(21) Appl. No.: 12/740,507

(22) Filed: Apr. 29, 2010

(65) Prior Publication Data

US 2012/0034532 A1 Feb. 9, 2012

Related U.S. Application Data

(63) Continuation of application No. PCT/KR2009/006868, filed on Nov. 20, 2009.

(30) Foreign Application Priority Data

Nov. 20, 2008 (KR) .................. 10-2008-0115591

(51) Int. Cl.
*H01M 10/056* (2010.01)

(52) U.S. Cl.
USPC ........... 429/302; 429/188; 429/329; 429/334; 252/62.2

(58) Field of Classification Search
USPC .................. 429/188, 302, 329, 334; 252/62.2
See application file for complete search history.

(56) References Cited

U.S. PATENT DOCUMENTS 3,462,369 A * 8/1969 Mankowich Abraham .. 510/366
6,872,493 B2 3/2005 Yamada et al.
2002/0076619 A1* 6/2002 Yamada et al. ............... 429/324
2005/0170253 A1* 8/2005 Yoon et al. .................... 429/307
2006/0147809 A1* 7/2006 Amine et al. ................. 429/326
2007/0015048 A1* 1/2007 Lee et al. ...................... 429/118
2009/0280414 A1 11/2009 Koh et al.
2011/0206997 A1* 8/2011 Kim et al. ..................... 429/326
2013/0002286 A1 1/2013 Kennedy et al.
2013/0022861 A1* 1/2013 Miyagi et al. ................. 429/163

FOREIGN PATENT DOCUMENTS

| JP | 11-214032 A | 8/1999 |
| JP | 2002-134169 A | 5/2002 |
| JP | 2003-173816 A | 6/2003 |
| JP | 2003-323915 A | 11/2003 |
| JP | 2007149656 A | 6/2007 |
| KR | 20030059729 A | 7/2003 |
| KR | 20070103296 A | 10/2007 |
| KR | 20080026522 A | 3/2008 |
| WO | WO 2008/035928 | * 3/2008 |

OTHER PUBLICATIONS

Material Safety Data Sheet of hexamethyldisiloxane.*
STIC (Scientific and Technical Information Center) search attached; STIC search completed by Jan Delaval; completed on Jan. 19, 2012.*
Material Safety Data Sheet of Hexamethyldisloxane, Accessed at http://www.sciencelab.com/msds.php?msdsId=9924249, available Oct. 9, 2005.*

* cited by examiner

*Primary Examiner* — Ula C Ruddock
*Assistant Examiner* — Amanda Barrow
(74) *Attorney, Agent, or Firm* — Lerner, David, Littenberg, Krumholz & Mentlik, LLP

(57) ABSTRACT

A non-aqueous electrolyte solution for a lithium secondary battery comprises a lithium salt and an organic solvent. The non-aqueous electrolyte solution further comprises a specific siloxane compound and a sulfonate compound. This non-aqueous electrolyte solution solves the capacity degradation phenomenon, which appears in a lithium secondary battery using a non-aqueous electrolyte solution containing only a specific siloxane compound when the lithium secondary battery is used for a long time, so this non-aqueous electrolyte solution is especially useful for high-capacity batteries.

9 Claims, 2 Drawing Sheets

NON-AQUEOUS ELECTROLYTE SOLUTION FOR LITHIUM SECONDARY BATTERY AND LITHIUM SECONDARY BATTERY COMPRISING THE SAME

CROSS-REFERENCE TO RELATED APPLICATIONS

The present application is a continuation of International Application No. PCT/KR2009/006868, filed on Nov. 20, 2009, which claims priority under 35 U.S.C. 119 to Korean Patent Application No. 10-2008-0115591 filed in Republic of Korea on Nov. 20, 2008, the disclosure of which is hereby incorporated herein by reference.

TECHNICAL FIELD

The present invention relates to a non-aqueous electrolyte solution for lithium secondary batteries, which may solve the capacity degradation phenomenon caused by a long-time use of a lithium secondary battery to which the non-aqueous electrolyte solution having a siloxane compound is applied. The present invention also relates to a lithium secondary battery containing such a non-aqueous electrolyte solution.

BACKGROUND OF THE INVENTION

Recently, interests in energy storage technologies have increased. As the energy storage technologies are relevant to cellular phones, camcorders and notebook PC, and further to electric vehicles, the demand for a battery with high-energy concentration as a power source of such an electronic device has increased. A lithium ion secondary battery is one of the most satisfactory batteries, and many studies are now in active progress.

Among the secondary batteries currently in use is a lithium secondary battery developed in the early 1990's including an anode made of carbon material capable of intercalating or disintercalating lithium ions, a cathode made of lithium-containing oxide, and a non-aqueous electrolyte solution obtained by dissolving a suitable amount of lithium salt in a mixed organic solvent.

Such lithium secondary battery has an average discharge voltage of about 3.6 to 3.7V, which is advantageously higher than those of other batteries such as alkali batteries or nickel-cadmium batteries. To give such a high operation voltage, an electrolyte composition that is electrochemically stable in a charging/discharging voltage range from 0 to 4.5V is required. For this purpose, a mixed solvent in which a cyclic carbonate compound such as ethylene carbonate or propylene carbonate and a linear carbonate compound such as dimethyl carbonate, ethylmethyl carbonate or diethyl carbonate are suitably mixed is used as a solvent of electrolyte. A solute of electrolyte commonly uses a lithium salt such as $LiPF_6$, $LiBF_4$ and $LiClO_4$, which acts as a source for supplying lithium ions in a battery and thus enables the lithium battery to operate.

Lithium ions coming out from a cathode active material such as lithium metal oxide during an initial charging process of a lithium secondary battery are moved to an anode active material such as graphite and then intercalated between layers of the anode active material. At this time, due to the strong reactivity of lithium, electrolyte reacts with carbon of the anode active material on the surface of the anode active material such as graphite, thereby generating compounds such as $Li_2CO_3$, $Li_2O$ and $LiOH$. These compounds form a kind of SEI (Solid Electrolyte Interface) film on the surface of the anode active material such as graphite.

The SEI film plays a role of ion tunnel, which allows only lithium ions to pass. Due to the effects of ion tunnel, the SEI film prevents an organic solvent molecule moving together with lithium ions in the electrolyte solution and having a great molecular weight from being intercalated into layers of the anode active material and thus breaking down the anode structure. Thus, since the electrolyte solution is not contacted with the anode active material, the electrolyte solution is not decomposed, and also an amount of lithium ions in the electrolyte solution is reversibly kept, thereby ensuring stable charging/discharging.

However, the SEI film is insufficient to play a role of a continuous protective film of an anode, so the life cycle and performance of a battery are deteriorated as the battery repeats charging/discharging. In particular, the SEI film of a lithium secondary battery is thermally unstable. Thus, if a battery is operated or left alone under a high temperature circumstance, the battery may be easily collapsed due to electrochemical energy and thermal energy, which are increased as time goes. For this reason, the battery performance is further deteriorated under a high temperature circumstance.

In order to solve the problems discussed above, non-aqueous electrolyte solutions having various additives have been proposed.

Korean Laid-open Patent Publication No. 2003-59729 and Japanese Laid-open Patent Publication Nos. 2003-323915, 2002-134169 and 2003-173816 disclose a non-aqueous electrolyte solution containing a siloxane compound such as 1,3-divinyltetramethyldisiloxane. As disclosed in these documents, if a predetermined siloxane compound is added to a non-aqueous electrolyte solution, life cycle and low temperature characteristics of a battery are improved. However, in case a lithium secondary battery adopting a non-aqueous electrolyte solution to which a predetermined siloxane compound such as 1,3-divinyltetramethyldisiloxane is added is used for a long time, the capacity of the battery may be degraded.

SUMMARY OF THE INVENTION

The present invention is designed to solve the problems of the prior art, and therefore an aspect of the present invention is to provide a non-aqueous electrolyte solution for lithium secondary batteries, which may solve the capacity degradation phenomenon caused by a long-term use of a lithium secondary battery having a siloxane compound in the non-aqueous electrolyte solution, and a lithium secondary battery comprising the same.

Another aspect of the present invention is to provide a non-aqueous electrolyte solution, which may solve a swelling problem in addition to the capacity degradation problem discussed above, and a lithium secondary battery comprising the same.

Yet another aspect of the present invention is to provide a non-aqueous solution for a lithium secondary battery, which comprises a lithium salt and an organic solvent, wherein the non-aqueous electrolyte solution further comprises a compound of the following chemistry figure 1; and a sulfonate compound of the following chemistry figure 2.

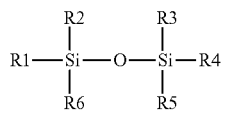

Chemistry Figure 1 where R1 to R6 are independently alkyl, alkenyl or alkylene group having 1 to 4 carbons, and R1 to R6 may be identical to or different from each other.

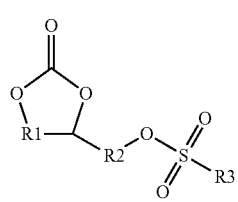

Chemistry Figure 2 where R1 and R2, which are identical to or different from each other, are alkylene group having 1 to 6 carbons, which is unsubstituted or substituted with alkyl or alkenyl group having 1 to 6 carbons, independently, and R3 is any one selected from the group consisting of hydrogen, linear alkyl group having 1 to 20 carbons, cyclic alkyl group having 3 to 8 carbons, linear alkenyl group having 2 to 20 carbons, cyclic alkenyl group having 3 to 8 carbons, haloalkyl group, halophenyl group, phenyl group and benzyl group.

In the non-aqueous electrolyte solution for a lithium secondary battery according to the present invention, the compound of the chemistry figure 1 may be 1,3-divinyltetramethyldisiloxane or hexamethyl siloxane, and the sulfonate compound may be at least one selected from the group consisting of 1,3-dioxolane-2-onylmethyl allyl sulfonate, 1,3-dioxolane-2-onylmethyl methyl sulfonate, 1,3-dioxolane-2-onylmethyl ethyl sulfonate, 1,3-dioxolane-2-onylmethyl propyl sulfonate, 1,3-dioxolane-2-onylmethyl butyl sulfonate, 1,3-dioxolane-2-onylmethyl pentyl sulfonate, 1,3-dioxolane-2-onylmethyl hexyl sulfonate, 1,3-dioxolane-2-onylmethyl cyclopentyl sulfonate, 1,3-dioxolane-2-onylmethyl cyclohexyl sulfonate, 1,3-dioxolane-2-onylmethyl cycloheptyl sulfonate, 1,3-dioxolane-2-onylmethyl trifluoromethyl sulfonate, 1,3-dioxolane-2-onylmethyl trifluoroethyl sulfonate, 1,3-dioxolane-2-onylmethyl benzyl sulfonate, 1,3-dioxolane-2-onylmethyl phenyl sulfonate, 1,3-dioxolane-2-onylmethyl parachlorophenyl sulfonate, 1,3-dioxolane-2-onylethyl allyl sulfonate, 1,3-dioxolane-2-onylethyl methyl sulfonate, 1,3-dioxolane-2-onylethyl cyclopentyl sulfonate, 1,3-dioxolane-2-onylethyl cyclohexyl sulfonate, 1,3-dioxolane-2-onylethyl trifluoromethyl sulfonate, 1,3-dioxolane-2-onylethyl trifluoroethyl sulfonate, 1,3-dioxolane-2-onylethyl benzyl sulfonate, 1,3-dioxolane-2-onylethyl phenyl sulfonate, 1,3-dioxolane-2-onylethyl parachlorophenyl sulfonate, 1,3-dioxane-2-onyl-4-methyl allyl sulfonate, 1,3-dioxane-2-onyl-4-methyl methyl sulfonate, 1,3-dioxane-2-onyl-4-methyl cyclopentyl sulfonate, 1,3-dioxane-2-onyl-4-methyl cyclohexyl sulfonate, 1,3-dioxane-2-onyl-4-methyl trifluoromethyl sulfonate, 1,3-dioxane-2-onyl-4-methyl trifluoroethyl sulfonate, 1,3-dioxane-2-onyl-4-methyl benzyl sulfonate, 1,3-dioxane-2-onyl-4-methyl phenyl sulfonate and 1,3-dioxane-2-onyl-4-methyl parachlorophenyl sulfonate.

In the non-aqueous electrolyte solution for a lithium secondary battery according to the present invention, the organic solvent may be any one selected from the group consisting of a cyclic carbonate selected from the group consisting of propylene carbonate, ethylene carbonate, vinylene carbonate, and mixtures thereof, a linear carbonate selected from the group consisting of diethyl carbonate, dimethyl carbonate, methylethyl carbonate, dipropyl carbonate, and mixtures thereof, dimethyl sulfoxide, acetonitrile, dimethoxyethane, diethoxyethane, sulforan, gamma-butyrolactone, ethylene sulfite, propylene sulfite, tetrahydrofuran, ethyl propionate, propyl propionate, and mixtures thereof. In particular, it is more preferable that the organic solvent comprises ethylene carbonate or a mixture of ethylene carbonate and propylene carbonate.

The above-mentioned non-aqueous electrolyte may be usefully applied to common lithium secondary batteries having an anode and a cathode.

The non-aqueous electrolyte solution for a lithium secondary battery according to the present invention gives the following effects.

First, the non-aqueous electrolyte solution of the present invention solves the capacity degradation problem caused by a long-term use of a lithium secondary battery to which the non-aqueous electrolyte solution having a predetermined siloxane compound is applied.

Second, the non-aqueous electrolyte solution of the present invention may solve a swelling problem of a battery.

Other aspects of the present invention will become apparent from the following description of embodiments with reference to the accompanying drawings.

DETAILED DESCRIPTION

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

A non-aqueous electrolyte solution for a lithium secondary battery according to the present invention includes a lithium salt and an organic solvent. Here, the non-aqueous electrolyte solution further includes a compound of the following chemical figure 1 and a sulfonate compound of the following chemistry figure 2.

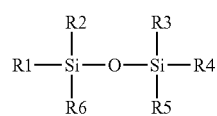

Figure 1:
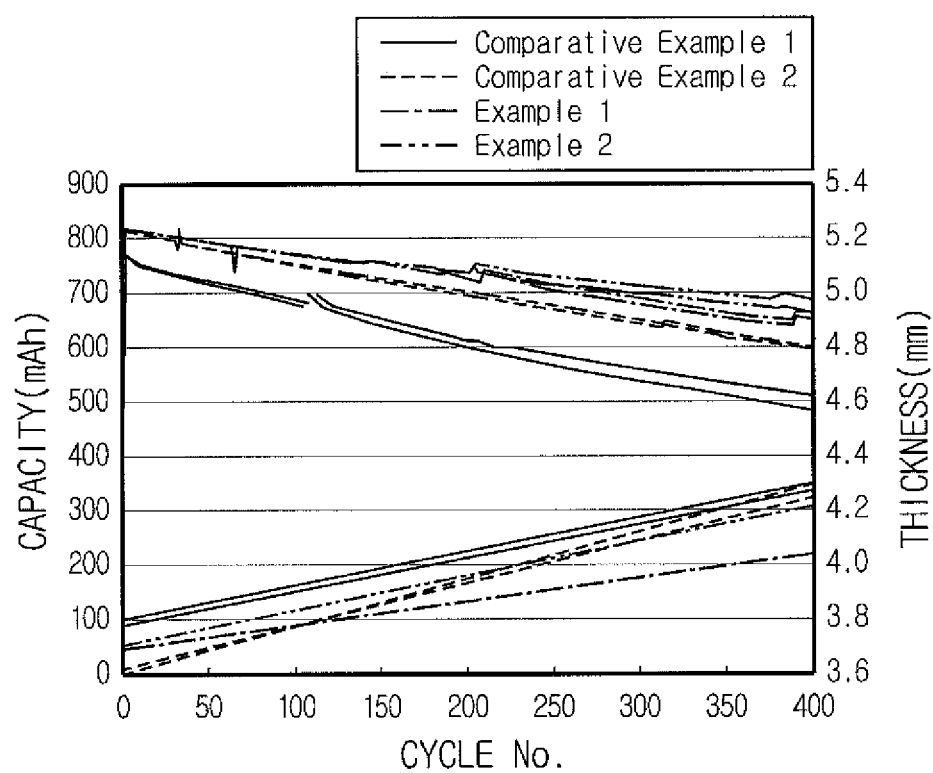
FIG. 1 is a graph showing the changes of capacity and thickness of batteries according to repeated charging/discharging according to an example and a comparative example.

Chemistry Figure 1 where R1 to R6 are alkyl, alkenyl or alkylene group having 1 to 4 carbons, independently, and R1 to R6 may be identical to or different from each other.

Figure 2:
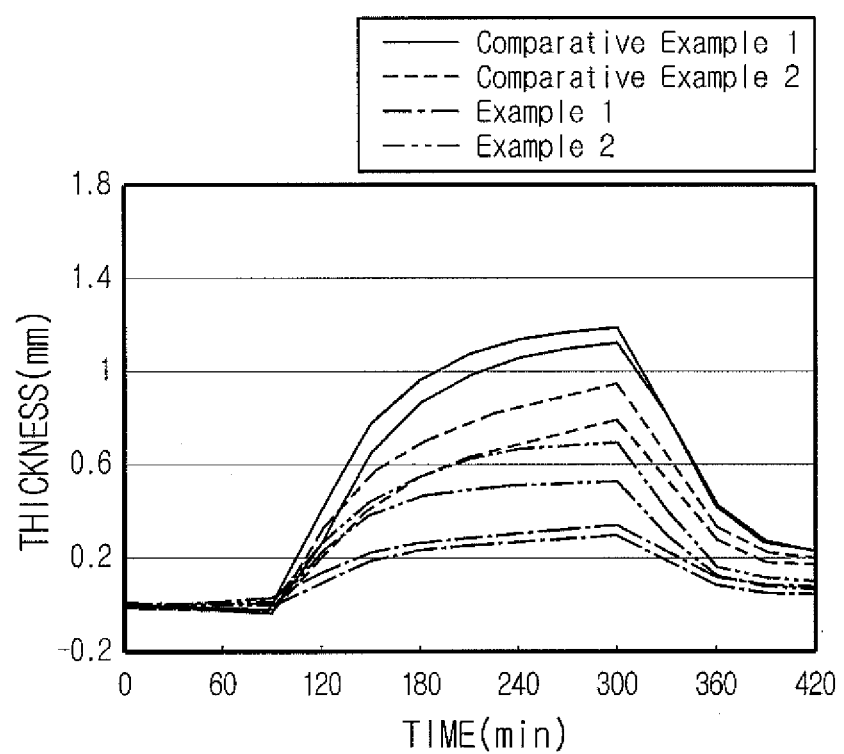
FIG. 2 is a graph showing the change of thickness of batteries according to time when the batteries according to the example and the comparative example are kept under a high temperature circumstance.

Chemistry Figure 2

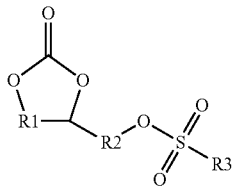

where R1 and R2 are alkylene group having 1 to 6 carbons, which is unsubstituted or substituted with alkyl or alkenyl group having 1 to 6 carbons, independently, and R1 and R2 may be identical to or different from each other. R3 is any one selected from the group consisting of hydrogen, linear alkyl group having 1 to 20 carbons, cyclic alkyl group having 3 to 8 carbons, linear alkenyl group having 2 to 20 carbons, cyclic alkenyl group having 3 to 8 carbons, haloalkyl group, halophenyl group, phenyl group and benzyl group.

As mentioned above, a predetermined siloxane compound such as 1,3-divinyltetramethyldisiloxane and hexamethyl disiloxane is added to a non-aqueous electrolyte solution to improve life cycle and low temperature characteristics of the battery. However, in case a lithium second battery having the non-aqueous electrolyte solution to which the siloxane compound of the chemistry figure 1 is used for a long time, the capacity of the battery may be degraded. The inventors found that, if the compound of the chemistry figure 1 is added together with the sulfonate compound of the chemistry figure 2, the capacity degradation caused by a long-time use of a battery may be solved and also the swelling problem of the battery may be solved, and then completed this invention.

Generally, the SEI film made of a carbonate-based organic solvent is weak and not dense, so it may be easily collapsed due to electrochemical energy and thermal energy, which are increased as the charging/discharging processes make progress. Thus, side effects continuously occur between the electrolyte solution and an exposed anode surface. In this reason, lithium ions in a battery may be continuously consumed, and also capacity and life cycle of the battery may be deteriorated. If a predetermined siloxane compound such as 1,3-divinyltetramethyldisiloxane is added to the non-aqueous electrolyte solution, the swelling problem of the battery may be solved to some extent, but it cannot give a great influence in improving an initial stability of the SEI film.

However, the sulfonate compound of the chemistry figure 2, added to the non-aqueous electrolyte solution of the present invention, forms a more stable polymer-type SEI film on an anode surface, so it may solve the above-mentioned problems, not covered by the compound of the chemistry figure 1. In other words, the compound of the chemistry figure 1 with a sulfonate group and a cyclic carbonate group together forms a reductant at an initial charging, thereby primarily forming a sulfonate radical —$SO_3^-$ and a radical $R^-$ of a substituted group introduced to a sulfonate group of the sulfonate compound. Meanwhile, the sulfonate radical is coupled with a lithium ion in the electrolyte solution to cause ring opening of the cyclic carbonate group in the sulfonate compound, thereby forming a radical $CO_3^-$ derived from the carbonate group. Accordingly, there are generated many radicals with great reactivity as mentioned above, so a polymerization reaction progresses on the anode surface to form a stable SEI film thereon. When forming such an SEI film, the sulfonate group is reduced to form a radical ahead of the carbonate group. Thus, the polymerization reaction may be initiated earlier, and the polymerization reaction may progress faster from the many radicals mentioned above, so the formation of a SEI film at an initial charging stage may be completed earlier.

The sulfonate compound in the above-mentioned chemistry figure 2 may be prepared in a common method well known in the art. For example, the sulfonate compound may be prepared through a reaction as in the following reaction figure 1.

Reaction Figure 1

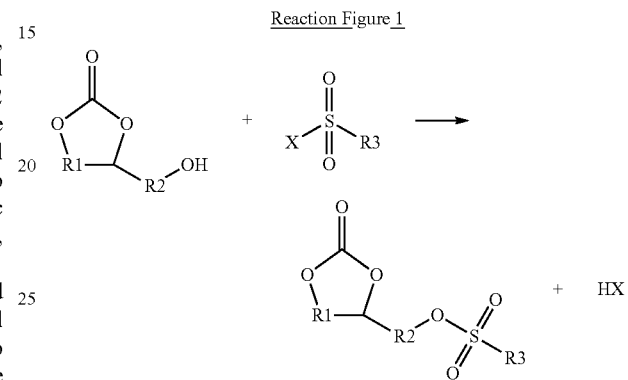

If the compound of the chemistry figure 1 and the sulfonate compound of the chemistry figure 2 are added to a non-aqueous electrolyte solution at the same time as mentioned above, the capacity degradation caused by a long-time use of a lithium secondary battery may be improved, and the swelling phenomenon of the battery may also be greatly decreased.

In the non-aqueous electrolyte solution for a lithium secondary battery according to the present invention, the compound of the chemistry figure 1 is representatively 1,3-divinyltetramethyldisiloxane, and the sulfonate compound of the chemistry 2 may be 1,3-dioxolane-2-onylmethyl allyl sulfonate, 1,3-dioxolane-2-onylmethyl methyl sulfonate, 1,3-dioxolane-2-onylmethyl ethyl sulfonate, 1,3-dioxolane-2-onylmethyl propyl sulfonate, 1,3-dioxolane-2-onylmethyl butyl sulfonate, 1,3-dioxolane-2-onylmethyl pentyl sulfonate, 1,3-dioxolane-2-onylmethyl hexyl sulfonate, 1,3-dioxolane-2-onylmethyl cyclopentyl sulfonate, 1,3-dioxolane-2-onylmethyl cyclohexyl sulfonate, 1,3-dioxolane-2-onylmethyl cycloheptyl sulfonate, 1,3-dioxolane-2-onylmethyl trifluoromethyl sulfonate, 1,3-dioxolane-2-onylmethyl trifluoroethyl sulfonate, 1,3-dioxolane-2-onylmethyl benzyl sulfonate, 1,3-dioxolane-2-onylmethyl phenyl sulfonate, 1,3-dioxolane-2-onylmethyl parachlorophenyl sulfonate, 1,3-dioxolane-2-onylethyl allyl sulfonate, 1,3-dioxolane-2-onylethyl methyl sulfonate, 1,3-dioxolane-2-onylethyl cyclopentyl sulfonate, 1,3-dioxolane-2-onylethyl cyclohexyl sulfonate, 1,3-dioxolane-2-onylethyl trifluoromethyl sulfonate, 1,3-dioxolane-2-onylethyl trifluoroethyl sulfonate, 1,3-dioxolane-2-onylethyl benzyl sulfonate, 1,3-dioxolane-2-onylethyl phenyl sulfonate, 1,3-dioxolane-2-onylethyl parachlorophenyl sulfonate, 1,3-dioxane-2-onyl-4-methyl allyl sulfonate, 1,3-dioxane-2-onyl-4-methyl methyl sulfonate, 1,3-dioxane-2-onyl-4-methyl cyclopentyl sulfonate, 1,3-dioxane-2-onyl-4-methyl cyclohexyl sulfonate, 1,3-dioxane-2-onyl-4-methyl trifluoromethyl sulfonate, 1,3-dioxane-2-onyl-4-methyl trifluoroethyl sulfonate, 1,3-dioxane-2-onyl-4-methyl benzyl sulfonate, 1,3-dioxane-2-onyl-4-methyl phenyl sulfonate, 1,3-dioxane-2-onyl-4-methyl parachlorophenyl sulfonate and so on, in single or in mixture.

In the non-aqueous electrolyte solution of the present invention, the compound of the chemistry figure 1 and the sulfonate compound of the chemistry figure 2 are preferably added to have the amount of about 0.1 to about 0.5 weight % and about 0.5 to about 5 weight %, respectively.

In the non-aqueous electrolyte solution for a lithium secondary battery according to the present invention, the lithium salt included as an electrolyte may use any one commonly used for electrolyte solutions for lithium secondary batteries. Representatively, the lithium salt may be $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$ and so on, which may be used in single or in mixture. Besides, other compounds such as lactone, ether, ester, acetonitrile, lactam, and ketone may be added to the non-aqueous electrolyte of the lithium secondary battery without deteriorating the purpose of the present invention.

In addition, the organic solvent included in the non-aqueous electrolyte solution of the present invention may use any one commonly used for lithium secondary batteries. Representatively, the organic solvent may use a cyclic carbonate such as propylene carbonate, ethylene carbonate and vinylene carbonate, a linear carbonate such as diethyl carbonate, dimethyl carbonate, methylethyl carbonate and dipropyl carbonate, dimethyl sulfoxide, acetonitrile, dimethoxyethane, diethoxyethane, sulforan, gamma-butyrolactone, ethylene sulfite, propylene sulfite, tetrahydrofuran, ethyl propionate and propyl propionate, in single or in mixture, but not limitedly. In particular, ethylene carbonate or a mixture of ethylene carbonate and propylene carbonate may more easily dissociate a lithium salt in an electrolyte due to high dielectric constants, so it contributes to improvement of charging/discharging capacity of a battery. In case propylene carbonate is mixed, a volume ratio of propylene carbonate is preferably ¼ to 1 with respect to ethylene carbonate. In addition to the above-mentioned cyclic carbonate, linear carbonate with low viscosity and low dielectric constant such as dimethyl carbonate and diethyl carbonate may be more preferably used in mixture, which allows making an electrolyte solution with high electric conductivity.

The non-aqueous electrolyte solution for a lithium secondary battery according to the present invention is applied to a lithium secondary battery having an anode made of carbon material, metal alloy, lithium-containing oxide, silicon-containing material bondable to lithium or the like, which may intercalate or disintercalate lithium ions used in the lithium secondary battery of the present invention, and a cathode made of lithium-containing oxide or the like.

The carbon material capable of intercalating or disintercalating lithium ions may employ any material capable of being used as a carbon material anode of a lithium secondary battery such as low-crystalline carbon and high-crystalline carbon. The low-crystalline carbon is representatively soft carbon or hard carbon, and the high-crystalline carbon is representatively natural graphite, Kish graphite, pyrolytic carbon, mesophase pitch based carbon fiber, meso-carbon microbeads, mesophase pitches, and high-temperature sintered carbon such as petroleum or coal tar pitch derived cokes. In addition, alloys containing silicon or oxides such as $Li_4Ti_5O_{12}$ may be used for an anode. At this time, the anode may have a binding agent, which may use various kinds of binder polymer such as PVDF-co-HFP, polyvinylidenefluoride, polyacrylonitrile, polymethylmethacrylate, and styrene-butadiene rubber (SBR).

Also, a cathode active material made of lithium-containing oxide preferably employs a lithium-containing transition metal oxide, for example any one material selected from the group consisting of $LiCoO_2$, $LiNiO_2$, $LiMnO_2$, $LiMn_2O_4$, $Li(Ni_aCo_bMn_c)O_2(0<a<1, 0<b<1, 0<c<1, a+b+c=1)$, $LiNi_{1-y}Co_yO_2(0\leq y<1)$, $LiCO_{1-y}Mn_yO_2(0\leq y<1)$, $LiNi_{1-y}Mn_yO_2(0\leq y<1)$, $Li(Ni_aCo_bMn_c)O_4(0<a<2, 0<b<2, 0<c<2, a+b+c=2)$, $LiMn_{2-z}Ni_zO_4(0<z<2)$, $LiMn_{2-z}CO_zO_4(0<z<2)$, $LiCoPO_4$ and $LiFePO_4$, or their mixtures.

In addition, a separator is commonly interposed between the cathode and the anode, and the separator may use common porous polymer films used as conventional separators, such as porous polymer films made using ethylene homopolymer, propylene homopolymer, ethylene/butene copolymer, ethylene/hexene copolymer and ethylene/methacrylate copolymer, in single or in laminate. In other cases, the separator may use common porous non-woven fabrics such as a non-woven fabric made of glass fiber with a high melt point or polyethylene terephthalate fiber, but not limitedly.

The secondary battery of the present invention has an appearance, not specially limited, but the appearance may be a cylindrical shape using a can, an angled shape, a pouch shape or a coin shape.

EXAMPLES

Hereinafter, the present invention is explained in more detail using examples. However, the following examples may be modified in various ways, and the present invention should not be interpreted as being limited thereto. The following examples are just given for persons having ordinary skill in the art to understand the present invention in a better way.

Example of Composition 50 g (0.42 mol) of 4-(hydroxymethyl)-1,3-dioxolane-2-on and 57.5 g (0.42 mol) of allylsulfonyl chloride were stirred and put into 500 ml of acetonitrile. After that, 58.5 ml (0.42 mol) of triethylamine was slowly dropped thereto, and then stirred at a room temperature for 24 hours for reaction (see the following reaction figure 2).

Reaction Figure 2

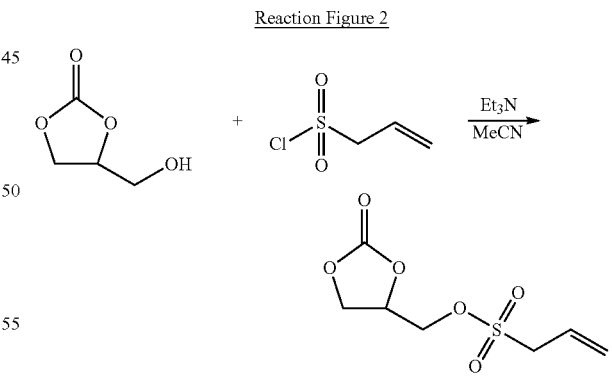

The material obtained by the above reaction was distilled in 500 ml of water, and then an organic layer was extracted using ethylacetate. At this time, sodium sulfate was applied thereto to remove surplus water. Subsequently, a rotary evaporator was used to obtain a reaction mixture, and the reaction mixture was purified using a silica gel chromatography.

As a result, 75.5 g (81% yield) of 1,3-dioxolane-2-onylmethyl allyl sulfonate was obtained, which was confirmed using NMR and a mass spectroscopy.

$^1$H NMR (400 MHz, CDCl$_3$): 5.85 (m, 1H), 5.53 (m, 2H), 5.02 (m, 1H), 4.60 (t, J=9.2 Hz, 1H), 4.50 (dd, J=12 Hz, J=2.8 Hz, 1H), 4.36 (m, 2H), 3.95 (d, J=7.2, 2H).

$^{13}$C NMR (100 MHz, CDCl$_3$): 155.1, 125.8, 124.2, 74.2, 68.9, 66.1, 55.2.

MS (EI) (calcd for C$_7$H$_{10}$O$_6$S, 222. Found: 222).

Example 1

LiPF$_6$ was added to a solvent in which ethylene carbonate (EC), propylene carbonate (PC) and diethyl carbonate (DEC) were mixed at a weight ratio of 3:2:5 to make a 1M LiPF$_6$ solution, and then 2 weight % of 1,3-dioxolane-2-onylmethyl allyl sulfonate and 0.5 weight % of 1,3-divinyltetramethyldisiloxane were further added to the solution, based on the entire weight of the solution, to make a non-aqueous electrolyte solution.

Example 2

LiPF$_6$ was added to a solvent in which ethylene carbonate (EC), propylene carbonate (PC) and diethyl carbonate (DEC) were mixed at a weight ratio of 3:2:5 to make a 1M LiPF$_6$ solution, and then 2 weight % of 1,3-dioxolane-2-onylmethyl allyl sulfonate and 0.5 weight % of hexamethyl disiloxane were further added to the solution, based on the entire weight of the solution, to make a non-aqueous electrolyte solution.

Comparative Example 1

A non-aqueous electrolyte solution was prepared in the same way as the example 1, except that only 0.5 weight % of 1,3-divinyltetramethyldisiloxane was added without 1,3-dioxolane-2-onylmethyl allyl sulfonate.

Comparative Example 2

A non-aqueous electrolyte solution was prepared in the same way as the example 1, except that only 2 weight % of 1,3-dioxolane-2-onylmethyl allyl sulfonate was added without 1,3-divinyltetramethyldisiloxane.

Lithium polymer secondary batteries with a thickness of 3.8 mm were made in a common way using the non-aqueous electrolyte solutions prepared in the examples and the comparative examples, a mixture of LiCoO$_2$ and Li(Ni$_a$CO$_b$Mn$_c$)O$_2$, (wherein 0<a<1, 0<b<1, 0<c<1, and a+b+c=1) at a ratio of 2:1 as a cathode and artificial graphite as an anode. After the electrolyte solutions were injected into the prepared lithium polymer batteries, the lithium polymer batteries were activated and aged at a normal temperature and at a high temperature, and then basic capacities of the lithium polymer batteries were checked at a room temperature.

At this time, the batteries were charged to 4.2V under a constant current/constant voltage condition, and then discharged to 3.0V under a constant current condition, which is called a basic charging/discharging condition. For the prepared batteries, life cycle, performance characteristics and status of components were measured in the following way.

Life Cycle Characteristics

The batteries prepared according to the embodiments and the comparative examples (two batteries for each case) were initially charged/discharged, and then basically charged/discharged at 1.0 C-rate 400 times at a normal temperature (25° C.). The changes of capacity and thickness of the batteries according to the repetition number of charging/discharging are shown in FIG. 1. In the graph of FIG. 1, upper lines represent the change of capacity of the batteries, and lower lines represent the change of thickness of the batteries. As illustrated in FIG. 1, one lower line is illustrated for each of Examples 1 and 2, representing one of the two batteries for each of Examples 1 and 2.

Referring to the graph of FIG. 1, in the case of the batteries prepared according to the embodiments to which the non-aqueous electrolyte solution containing a small amount of the compound of the chemistry figure 1 together with 1,3-dioxolane-2-onylmethyl allyl sulfonate is applied, the performance of the battery is not seriously deteriorated when compared with the batteries containing only the compound of the chemistry figure 1 as in the comparative example or only the compound of the chemistry figure 2 as in the comparative example 2.

Component Characteristics

The batteries prepared according to the embodiments and the comparative examples (two batteries for each case) were initially charged/discharged, and then fully charged to 4.2V, respectively. After that, the batteries were kept in an oven where the batteries were heated from 25° C. to 90° C. during 1 hour, then preserved at 90° C. for 4 hours, then cooled to 25° C. during 1 hour, and then preserved at 25° C. for an hour. At this time, the thicknesses of the batteries were measured at 30 minute intervals. The measurement results are shown in FIG. 2.

Seeing the graph of FIG. 2, it would be found that the thickness of the battery according to the comparative example 1 or 2 was greatly increased, but the thicknesses of the batteries according to the embodiments 1 and 2 of the present invention were not seriously decreased.

What is claimed is:

1. A non-aqueous electrolyte solution for a lithium secondary battery, comprising a lithium salt and an organic solvent, wherein the non-aqueous electrolyte solution further comprises:
a compound of the following chemistry figure 1; and
a sulfonate compound the following chemistry figure 2:

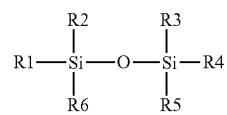

<Chemistry Figure 1> wherein R1 to R6 are alkyl, alkenyl or alkylene group having 1 to 4 carbons, independently, and R1 to R6 may be identical to or different from each other,

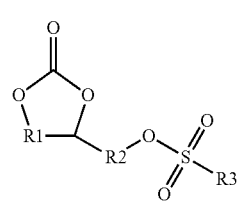

<Chemistry Figure 2> wherein R1 and R2 are identical to or different from each other and are alkylene group having 1 to 6 carbons, which may be unsubstituted or substituted with alkyl or alkenyl group having 1 to 6 carbons, independently, and R3 is any one selected from the group consisting of hydrogen, linear alkyl group having 1 to 20 carbons, cyclic alkyl group having 3 to 8 carbons, linear alkenyl group having 2 to 20 carbons, cyclic alkenyl group having 3 to 8 carbons, haloalkyl group, halophenyl group, phenyl group and benzyl group.

2. The non-aqueous electrolyte solution for a lithium secondary battery according to claim 1,
wherein the compound of the Chemistry figure 1 is 1,3-divinyltetramethyldisiloxane or hexamethyl disiloxane.

3. The non-aqueous electrolyte solution for a lithium secondary battery according to claim 1,
wherein the sulfonate compound is at least one selected from the group consisting of 1,3-dioxolane-2-onylmethyl allyl sulfonate, 1,3-dioxolane-2-onylmethyl methyl sulfonate, 1,3-dioxolane-2-onylmethyl ethyl sulfonate, 1,3-dioxolane-2-onylmethyl propyl sulfonate, 1,3-dioxolane-2-onylmethyl butyl sulfonate, 1,3-dioxolane-2-onylmethyl pentyl sulfonate, 1,3-dioxolane-2-onylmethyl hexyl sulfonate, 1,3-dioxolane-2-onylmethyl cyclopentyl sulfonate, 1,3-dioxolane-2-onylmethyl cyclohexyl sulfonate, 1,3-dioxolane-2-onylmethyl cycloheptyl sulfonate, 1,3-dioxolane-2-onylmethyl trifluoromethyl sulfonate, 1,3-dioxolane-2-onylmethyl trifluoroethyl sulfonate, 1,3-dioxolane-2-onylmethyl benzyl sulfonate, 1,3-dioxolane-2-onylmethyl phenyl sulfonate, 1,3-dioxolane-2-onylmethyl parachlorophenyl sulfonate, 1,3-dioxolane-2-onylethyl allyl sulfonate, 1,3-dioxolane-2-onylethyl methyl sulfonate, 1,3-dioxolane-2-onylethyl cyclopentyl sulfonate, 1,3-dioxolane-2-onylethyl cyclohexyl sulfonate, 1,3-dioxolane-2-onylethyl trifluoromethyl sulfonate, 1,3-dioxolane-2-onylethyl trifluoroethyl sulfonate, 1,3-dioxolane-2-onylethyl benzyl sulfonate, 1,3-dioxolane-2-onylethyl phenyl sulfonate, 1,3-dioxolane-2 onylethyl parachlorophenyl sulfonate, 1,3-dioxane-2-onyl-4-methyl allyl sulfonate, 1,3-dioxane-2-onyl-4-methyl methyl-sulfonate, 1,3-dioxane-2-onyl-4-methyl cyclopentyl sulfonate, 1,3-dioxane-2-onyl-4-methyl cyclohexyl sulfonate, 1,3-dioxane-2-onyl-4-methyl trifluoromethyl sulfonate, 1,3-dioxane-2-onyl-4-methyl trifluoroethyl sulfonate, 1,3-dioxane-2-onyl-4-methyl benzyl sulfonate, 1,3-dioxane-2-onyl-4-methyl phenyl sultanate and 1,3-dioxane-2-onyl-4-methyl parachlorophenyl sulfonate.

4. The non-aqueous electrolyte solution for a lithium secondary battery according to claim 1,
wherein the amount of the compounds of the Chemistry figures 1 and 2 are respectively about 0.1 to about 5 weight % and about 0.5 to about 5 weight %, based on the entire weight of the non-aqueous electrolyte solution.

5. The non-aqueous electrolyte solution for a lithium secondary battery according to claim 1,
wherein the organic solvent is any one selected from the group consisting of a cyclic carbonate selected from the group consisting of propylene carbonate, ethylene carbonate and vinylene carbonate, or their mixtures, a linear carbonate selected from the group consisting of diethyl carbonate, dimethyl carbonate, methylethyl carbonate and dipropyl carbonate, or their mixtures, dimethyl sulfoxide, acetonitrile, dimethoxyethane, diethoxyethane, sulforan, gamma-butyrolactone, ethylene, sulfite, propylene sulfite, tetrahydrofuran, propionate, propyl propionate, and mixtures thereof.

6. The non-aqueous electrolyte solution for a lithium secondary battery according to claim 1,
wherein the organic solvent is ethylene carbonate or a mixture of ethylene carbonate and propylene carbonate.

7. The non-aqueous electrolyte solution for a lithium secondary battery according to claim 1,
wherein the lithium salt is any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, and mixtures thereof.

8. A lithium secondary battery, comprising an anode, a cathode and a non-aqueous electrolyte solution,
wherein the non-aqueous electrolyte solution is a non-aqueous electrolyte solution defined in claim 1.

9. A non-aqueous electrolyte solution for a lithium secondary battery, comprising a lithium salt and an organic solvent,
wherein the non-aqueous electrolyte solution further comprises:
a compound of the following chemistry figure 1; and
a sulfonate compound of the following chemistry figure 2:

<Chemistry Figure 1>

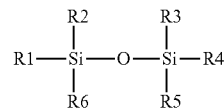

wherein R1 to R6 are alkyl, alkenyl or alkylene group having 1 to 4 carbons, independently, and at least some of R1 to R6 are different from each other, <Chemistry Figure 2>

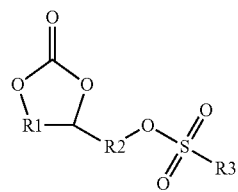

wherein R1 and R2 are identical to or different from each other and are alkylene group having 1 to 6 carbons, which may be unsubstituted or substituted with alkyl or alkenyl group having 1 to 6 carbons, independently, and R3 is any one selected from the group consisting of hydrogen, linear alkyl group having 1 to 20 carbons, cyclic alkyl group having 3 to 8 carbons, linear alkenyl group having 2 to 20 carbons, cyclic alkenyl group having 3 to 8 carbons, haloalkyl group, halophenyl group, phenyl group and benzyl group.

* * * * *

UNITED STATES PATENT AND TRADEMARK OFFICE
CERTIFICATE OF CORRECTION

PATENT NO.         : 8,535,833 B2                                      Page 1 of 1
APPLICATION NO.    : 12/740507
DATED              : September 17, 2013
INVENTOR(S)        : Soo-Jin Kim et al.

It is certified that error appears in the above-identified patent and that said Letters Patent is hereby corrected as shown below:

Claims
Column 11, line 33, claim 3, "2 onylethyl" should read -- 2-onylethyl --.
Column 11, line 41, claim 3, delete "sultanate" and insert therefor -- sulfonate --.
Column 11, line 46, claim 4, "figures" should read -- Figures --.
Column 12, line 3, claim 5, after "ene" delete ","; after "tetrahydrofuran," insert -- ethyl --.

Signed and Sealed this
Twelfth Day of January, 2016

Michelle K. Lee
*Director of the United States Patent and Trademark Office*